(12) United States Patent
Zhou (10) Patent No.: US 7,454,110 B1
(45) Date of Patent: Nov. 18, 2008

(54) METHOD OF CONSTRUCTING A RECONFIGURABLE PHOTONIC BAND GAP DEVICE

(75) Inventor: Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/642,678

(22) Filed: Dec. 21, 2006

Related U.S. Application Data (62) Division of application No. 11/068,779, filed on Mar. 2, 2005, now Pat. No. 7,158,710.

(60) Provisional application No. 60/550,846, filed on Mar. 5, 2004.

(51) Int. Cl.
G02B 6/10 (2006.01)
(52) U.S. Cl. .................................................. 385/129
(58) Field of Classification Search ................ 385/129
See application file for complete search history.

(56) References Cited

U.S. PATENT DOCUMENTS

| 5,682,401 | A | * | 10/1997 | Joannopoulos et al. | 372/96 |
| 6,711,200 | B1 | * | 3/2004 | Scherer et al. | 372/64 |
| 6,788,847 | B2 | * | 9/2004 | Paddon et al. | 385/31 |
| 7,158,710 | B1 | * | 1/2007 | Zhou | 385/129 |
| 2005/0213911 | A1 | * | 9/2005 | Stoltz et al. | 385/129 |

* cited by examiner

*Primary Examiner*—Frank G Font
*Assistant Examiner*—Eric Wong
(74) *Attorney, Agent, or Firm*—William V. Adams; Guy M. Miller (57) ABSTRACT

A method for constructing a reconfigurable photonic band gap device having a substrate and a crystal membrane with a lattice structure having its ends attached to a substrate so that a midportion of the lattice membrane is spaced upwardly from the substrate and forms a chamber therebetween. A bridge is disposed in the chamber between and separated from both the lattice membrane midportion and the substrate. At least one post is attached to the bridge and aligned with at least one hole in the lattice so that movement of the bridge relative to the lattice varies the degree of insertion of the post relative to its associated hole to vary the photonic band gap behavior of the device.

7 Claims, 7 Drawing Sheets

METHOD OF CONSTRUCTING A RECONFIGURABLE PHOTONIC BAND GAP DEVICE

RELATED APPLICATION

This application is a Divisional application of U.S. patent application Ser. No. 11/068,779, filed Mar. 2, 2005 now U.S. Pat. No. 7,158,710, which has now issued as a patent, and which claimed priority of U.S. Provisional Patent Application Ser. No. 60/550,846 filed Mar. 5, 2004, each of which are incorporated herein by reference.

GOVERNMENT INTEREST

The invention described herein may be manufactured, used, and licensed by or for the United States Government.

FIELD OF THE INVENTION

The present invention relates generally to photonic band gap devices and, more particularly, to a reconfigurable photonic band gap device.

DESCRIPTION OF RELATED ART

Photonic band gap (PBG) structures typically comprise a crystal lattice which disallows the propagation of light of certain wavelengths through the lattice. However, when a defect line is created on the photonic crystal structure, the PBG structure can be configured as an optical waveguide which facilitates the propagation of light of certain wavelengths. Variations in the physical dimension of the defect line change the dispersion properties of the waveguide to facilitate or enable light propagation. Therefore, a photonic integrated circuit can be built with such a PBG structure.

A primary disadvantage of the previously known photonic crystal based photonic integrated circuits is that such photonic integrated circuits are formed with fixed lattice structures and fixed defect lines and, accordingly, exhibit a fixed functionality. Consequently, in order to form a photonic system having different functionalities, it is necessary to use different types of photonic integrated circuits interconnected together. Each different photonic integrated circuit, of course, requires its own set of fabrication masks, etc., thus increasing the overall cost for the individual photonic integrated circuits and the corresponding overall cost of the photonic system.

SUMMARY OF THE INVENTION

The present invention provides a reconfigurable photonic band gap device which can be selectively configured to operate as any of a plurality of different photonic functionalities, such as waveguides, switches, time delays, intensity modulators, phase modulators, resonators, etc.

In brief, the reconfigurable photonic band gap device of the present invention comprises a semiconductor crystal substrate which may be of any conventional composition, such as a gallium arsenide substrate. A two-dimensional photonic crystal lattice membrane with a plurality of holes has its ends attached to the substrate so a midportion of the lattice membrane is spaced upwardly from the substrate and forms a chamber between the midportion of the lattice membrane and the substrate.

A bridge is disposed in the chamber between the substrate and the photonic crystal lattice membrane and is positioned closely adjacent the lattice membrane with a small distance of about one wavelength of the operating band gap light wavelength. The portion of the bridge which is aligned with the lattice membrane is separated from both the lattice membrane and the substrate and thus movable relative to the lattice membrane. The bridge is constructed of a crystal material compatible with the substrate and crystal lattice membrane, such as an alloy of the substrate.

At least one post extends from the bridge and is aligned with at least one hole in the lattice. Preferably, a plurality of linearly aligned posts extend from the bridge wherein each post is aligned with one hole in the lattice.

The bridge is movable relative to the lattice to vary the degree of insertion of each post into its corresponding hole in the lattice membrane. In order to move the bridge relative to the lattice, a first electrical contact is formed on the substrate and a second electrical contact is formed on the bridge. Consequently, by varying the voltage potential between the electrical contacts, the bridge flexes away from and towards the lattice as a result of coulombic attraction between the bridge and the substrate.

The present invention also discloses a method of making a reconfigurable photonic band gap device. The method includes the step of forming a wafer having a crystal substrate, a sacrificial layer overlying the crystal substrate, a bridge layer overlying the sacrificial layer, and a crystal membrane overlying the bridge layer. All of the wafer layers and membrane are made from compatible semiconductor crystalline material, such as gallium arsenide and/or alloys thereof.

A lattice is first etched through the crystal membrane layer using conventional electron beam lithography and reactive ion plasma etching so the layer has a plurality of lattice holes. The size, shape and spacing of the holes will vary as a function of the desired optical wavelength and the characteristics of the photonic band gap device. In addition, a portion of the crystal membrane is left intact within a plurality of linearly aligned holes in the lattice to form a defect line.

Thereafter, a portion of the sacrificial layer beneath the lattice is removed to form an internal chamber or space within the wafer. Any conventional means, such as an selective wet chemical etch, may be utilized to remove the sacrificial layer.

A portion of the bridge layer sufficient to separate the bridge layer from the crystal membrane is then removed by another selective wet chemical etch. Following this chemical etch at least one post comprising a portion of the bridge layer as well as a portion of the membrane extends into a registry lattice hole in the crystal membrane layer.

Electrical contacts are then attached to both the bridge layer as well as the substrate. In use, a voltage differential applied between the bridge and the substrate through the contacts flexes the bridge due to coulombic attraction. In doing so, the bridge with its attached post(s) moves toward and away from the membrane in order to vary the degree of insertion of the post(s) within their corresponding lattice holes.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DESCRIPTION OF A PREFERRED EMBODIMENT OF THE PRESENT INVENTION

Figure 1:
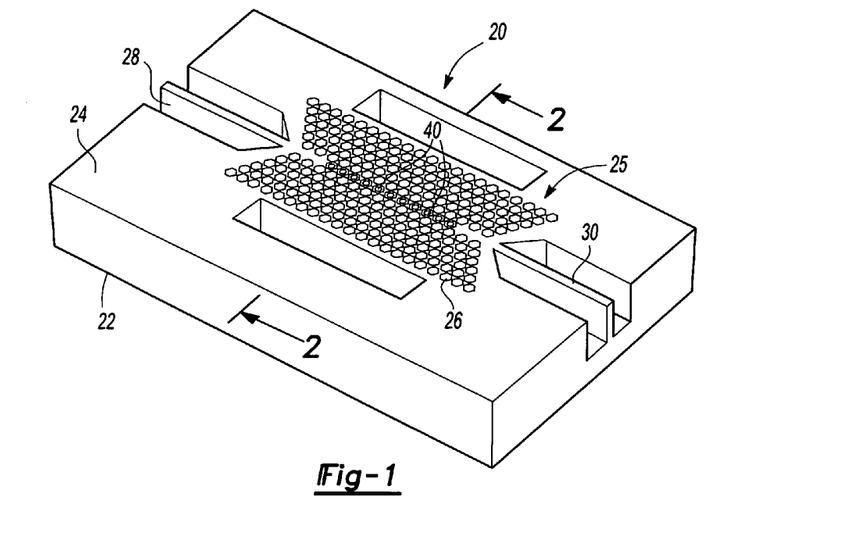
FIG. 1 is an elevational simplified view illustrating a preferred embodiment of the photonic band gap device of the present invention.
Figure 2:
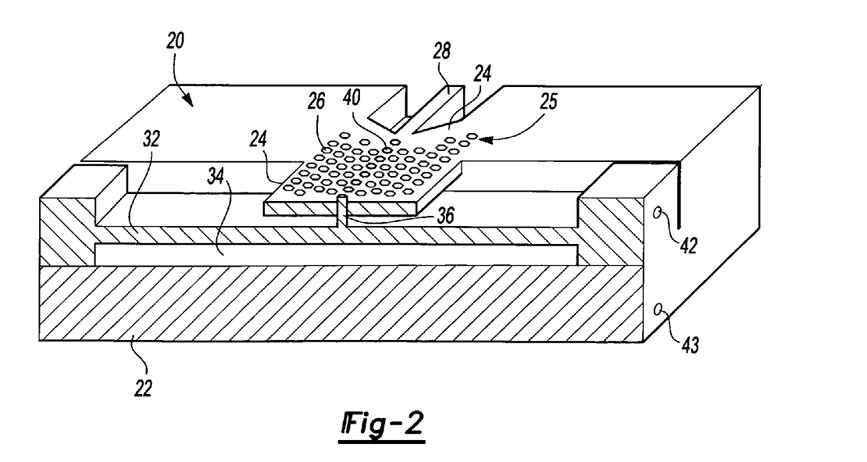
FIG. 2 is a sectional view taken substantially along line 2-2 in FIG. 1.

With reference first to FIGS. 1 and 2, a preferred embodiment of the photonic band gap device 20 of the present invention is shown and comprises a semiconductor crystal substrate 22. Any conventional material, such as gallium arsenide, may be used as the substrate 22.

A photonic crystal membrane 24 having a plurality of holes 26 which form a two-dimensional lattice structure 25 is attached to the substrate 22. Furthermore, the lattice structure 25 is positioned between an optical input 28 and an optical output 30 for the photonic device 20.

The lattice holes 26 may be of any conventional size and shape for a photonic band gap structure. However, as shown in the drawing, the lattice holes 26 are generally hexagonal in shape although other shapes may alternatively be used without deviation from the spirit or scope of the present invention. Furthermore, the distance between the centers of adjacent holes in the lattice structure 25, the size of the holes as well as the thickness of the wall separating the holes 26 from each other determine the band gap wavelength for the photonic band gap device 20 in the well known manner.

Referring now particularly to FIG. 2, a bridge 32 is attached to the substrate 22 and is positioned between the lattice structure 25 and the substrate 22. The bridge 32 may be either attached at both ends to the substrate 22 or may alternatively be of a cantilever design.

Figure 3:
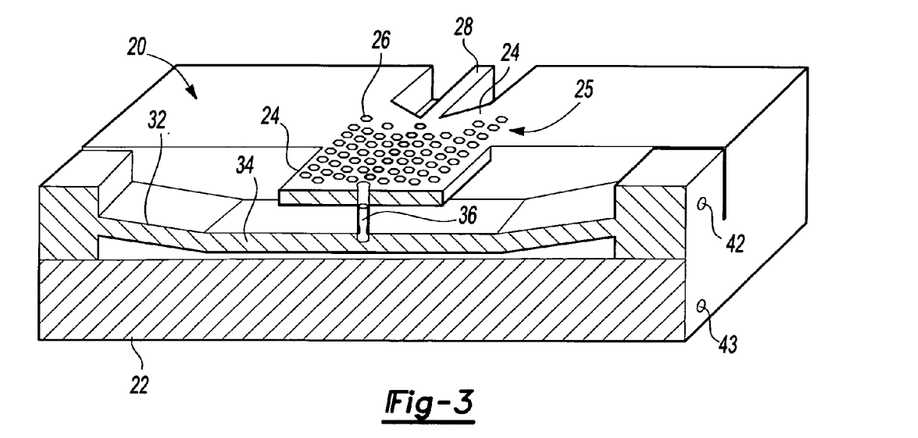
FIG. 3 is a view similar to FIG. 2, but illustrating the bridge in a flexed state.

The bridge 32 is made of a semiconductor crystal material compatible with the substrate 22, such as an alloy of the substrate 22. As best shown in FIGS. 2 and 3, a chamber 34 is formed in between the bridge 32 and the substrate 22 thus allowing the bridge 32 to flex between the position shown in FIG. 2 and the position shown in FIG. 3.

At least one, and preferably a plurality of posts 36 arranged in a geometric pattern, such as a line, extend upwardly from the bridge 32 between the optical input 28 and the optical output 30. Each post 36 is aligned with a corresponding hole 26 in the lattice structure 25. Consequently, as best shown in FIGS. 2-3, as the bridge 32 moves between the position shown in FIG. 2 and to the position shown in FIG. 3, the degree of insertion of each post 36 relative to its associated hole 26 will vary as a function of the deflection of the bridge 32.

Figure 4:
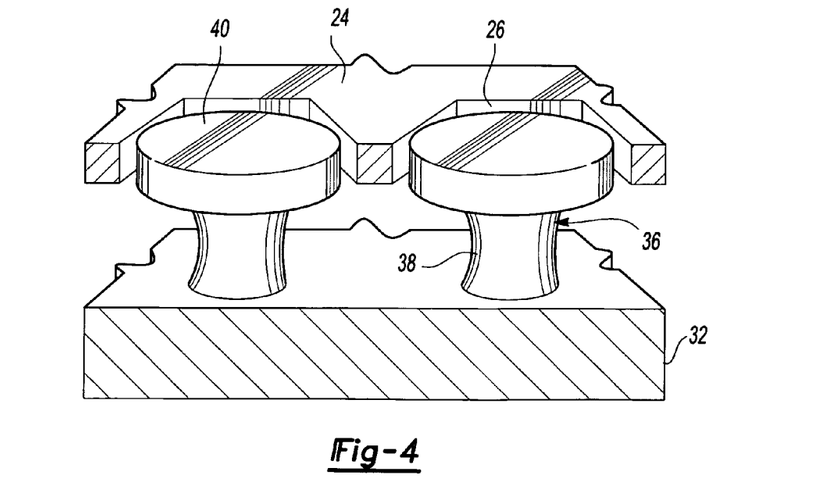
FIG. 4 is a diagrammatic enlarged view illustrating a portion of the present invention.

As best shown in FIG. 4, each post 36 preferably includes a stem 38 and a cap 40. The stem 38 is integral with and of the same material as the bridge 32, while the cap 40 is formed from a portion of the lattice membrane 24. The cap 40 is attached to the upper or free end of each stem 38, and it is the movement of the cap 40 relative to the lattice hole 26 which varies the degree of insertion of the posts 36 relative to the lattice holes 26.

With reference again to FIGS. 2 and 3, in order to deflect the bridge 32 relative to the lattice structure 25, a pair of electrical contacts 42 and 43 (illustrated only diagrammatically) are attached to the bridge 32 and substrate 22 in any conventional fashion. A voltage potential applied to the contacts 42 and 43 will cause the bridge 32 to deflect relative to the crystal membrane 24 due to the coulombic attraction between the bridge 32 and the substrate 22. The magnitude of that voltage potential, in turn, determines the amount of the deflection of the bridge 32 and thus the degree of insertion of the posts 36 into their corresponding holes 26 in the lattice structure 25.

In the well known fashion, the posts 36, when inserted into their corresponding holes 26 in the lattice structure 25, form a defect line which enables light propagation in single mode through the lattice structure 25. Conversely, when the posts 36 are retracted from their corresponding holes 26 in the lattice structure 25, the lattice structure 25 forms a band gap at the operating wavelength of the band gap device. However, by varying the voltage potential across the electrical contacts 42 and 43 and thus the degree of insertion of the posts 36 into the lattice holes 26, the band gap device 20 may be selectively configured as different optical devices including, but not limited to, a transmission waveguide, switch, intensity modulator, phase modulator, true time delay line and the like.

Figure 5A:
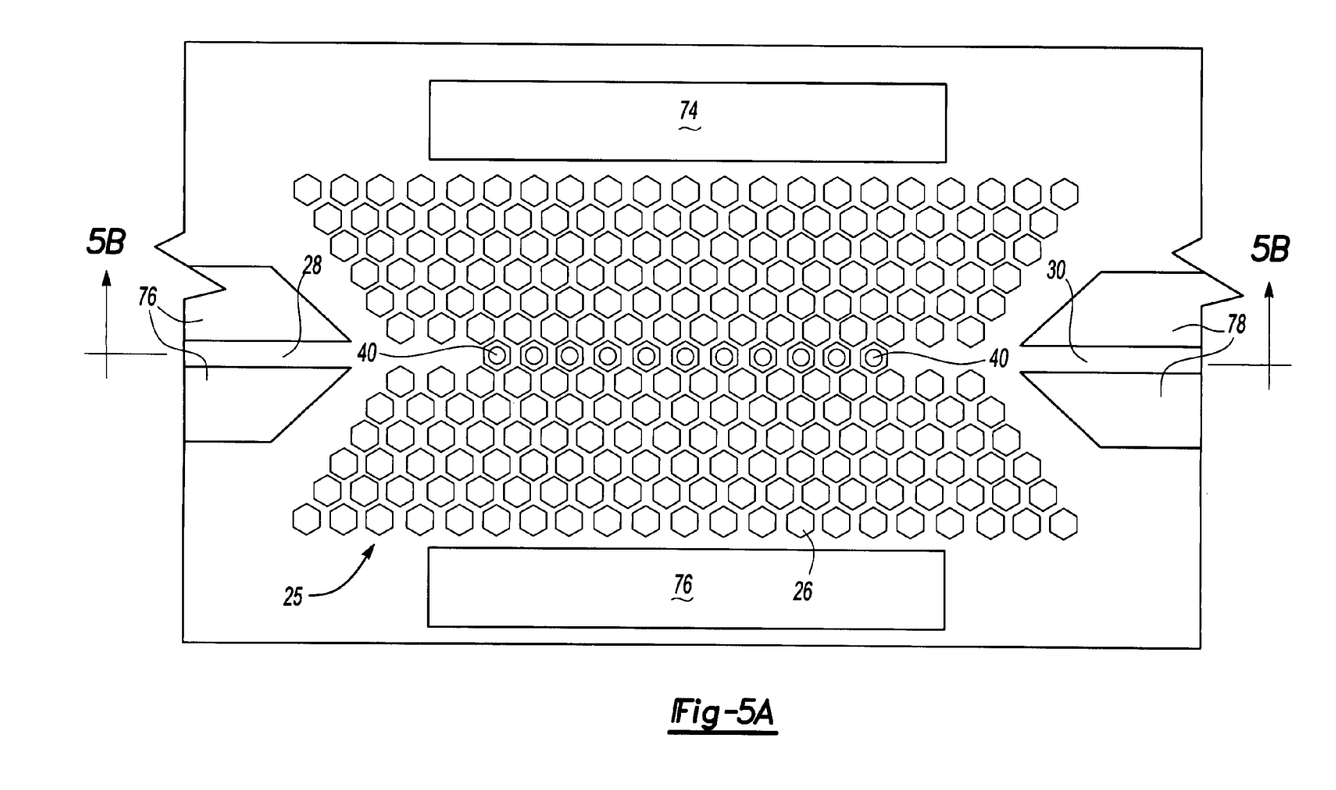
FIG. 5A is a top view illustrating a first step in making the photonic band gap device of the present invention.
Figure 5B:
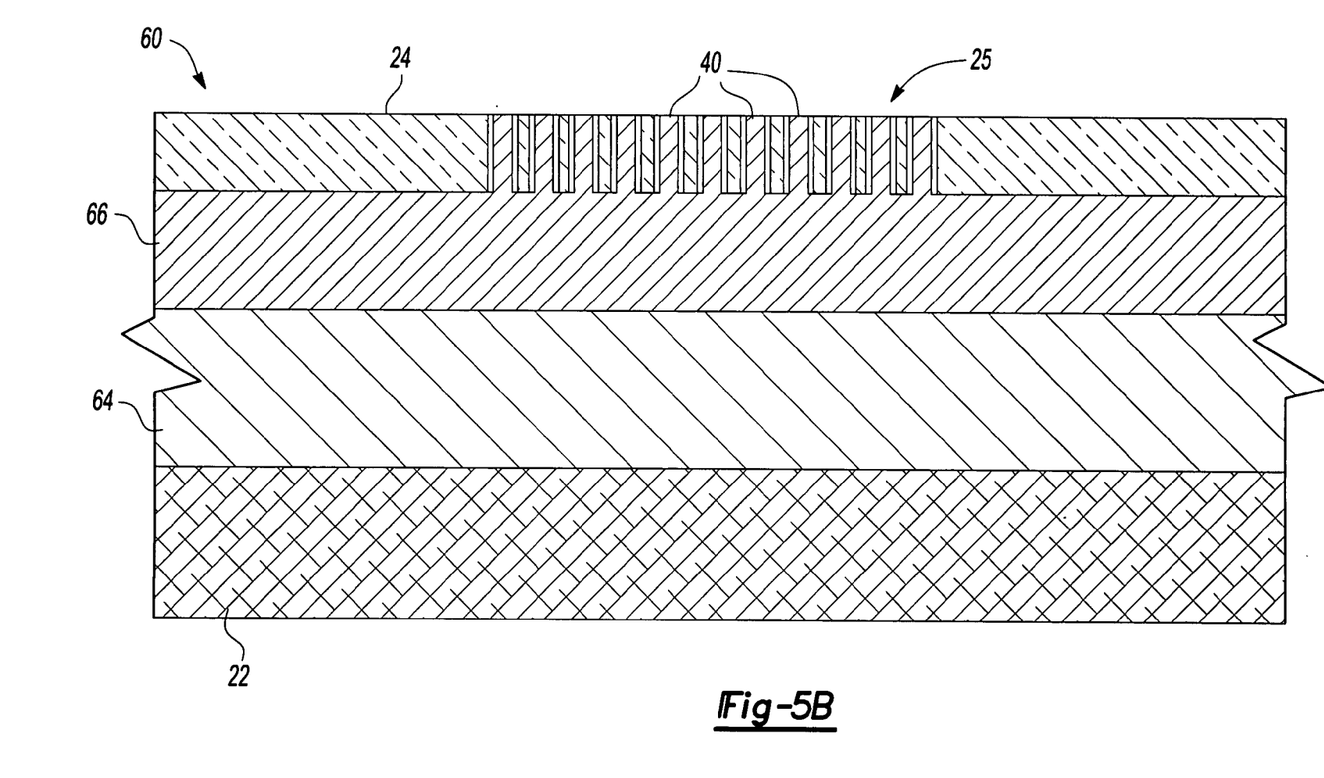
FIG. 5B is a sectional view taken along line 5B-5B in FIG. 5A.

With reference now to FIGS. 5A and 5B, a method for making the photonic band gap device 20 of the present invention will now be described in detail. As best shown in FIG. 5B, a wafer 60 is first formed having the semiconductor crystalline substrate 22. Any conventional material, such as gallium arsenide, may be used as the substrate 22.

A sacrificial layer 64 is then formed on one side of the substrate 22 so that the sacrificial layer 64 overlies and covers the substrate 22. The sacrificial layer 64 is made of a crystalline material compatible with the substrate 22, but which can be selectively etched by a chosen wet chemical that does not etch the membrane layer and/or substrate material, such as aluminum gallium arsenide ($Al_{x1}GaAs$) where x1 is in the range of 0.45 to 1.0. Any conventional means, such as molecular beam epitaxial (MBE) growth, may be used to form the sacrificial layer 64.

A bridge layer 66 made of a semiconductor crystalline material compatible with the sacrificial layer 64 is then formed so that the bridge layer 66 overlies and covers the sacrificial layer 64. The bridge layer 66 may be formed of any compatible material, such as an alloy of the substrate 22, and preferably comprises aluminum gallium arsenide ($Al_{x2}GaAs$) where x2 is in the range of 0.3 to 0.6. The aluminum content of the bridge layer 66 is at least ten percent less than the aluminum content of the sacrificial layer 64 for a reason to be subsequently described. In addition, the bridge layer 66 may be formed by any conventional means, such as MBE growth.

The crystal membrane 24 then overlies the bridge layer 66. The membrane 24 is of a crystalline material compatible with the bridge layer 66 and is preferably made of gallium arsenide. The thickness of the membrane 24 is determined by the waveguiding mode of the operating light. For example, the bridge layer 66 is preferably in the range of 1 to 6 microns whereas the crystal membrane 24 is approximately 0.3 microns in thickness for single mode waveguide with 1550 nm operation light wavelength.

With reference now to FIGS. 5A and 5B, the lattice structure 25 with its holes 26 is formed through the membrane 24 by any conventional method, such as electron beam lithography and reactive ion plasma etching. The shape, size and spacing of the holes 26 relative to each other define the band gap characteristics of the photonic device 20. In addition, portions of the membrane 24 which form the caps 40 of the posts 36 are left intact after the plasma etch.

In addition to forming the lattice holes 26 during the plasma etch, additional portions 74 and 76 of the membrane 24 adjacent and alongside the lattice structure 25 are also removed from the membrane 24 in order to isolate the sides of the lattice structure 25. Similarly, portions 76 adjacent one end of the lattice structure 25 and portions 78 adjacent the other end of the lattice structure 25 of the membrane 24 are also removed from the membrane 24 during the plasma etch. By removing the portions 76 and 78 from the membrane 24, the remaining membrane 24 in between the removed portions 76 of the membrane 24 form the optical input 28 to the lattice structure 25 while, similarly, the remaining membrane 24 between the removed portions 78 of the membrane 24 form the optical output 30 for the photonic device 20.

Figure 6A:
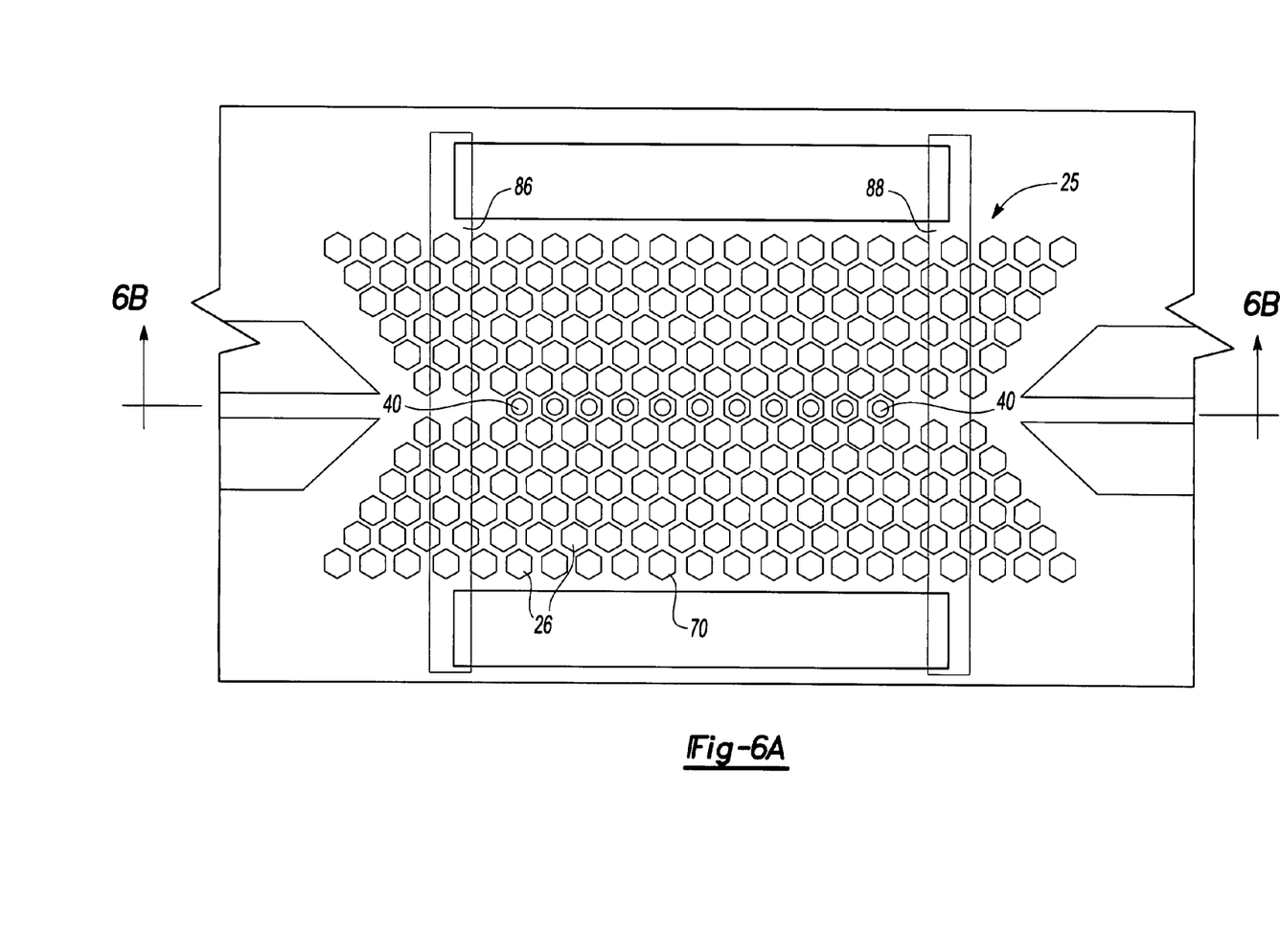
FIG. 6A is a top view of a second step in making the photonic band gap device of the present invention.
Figure 6B:
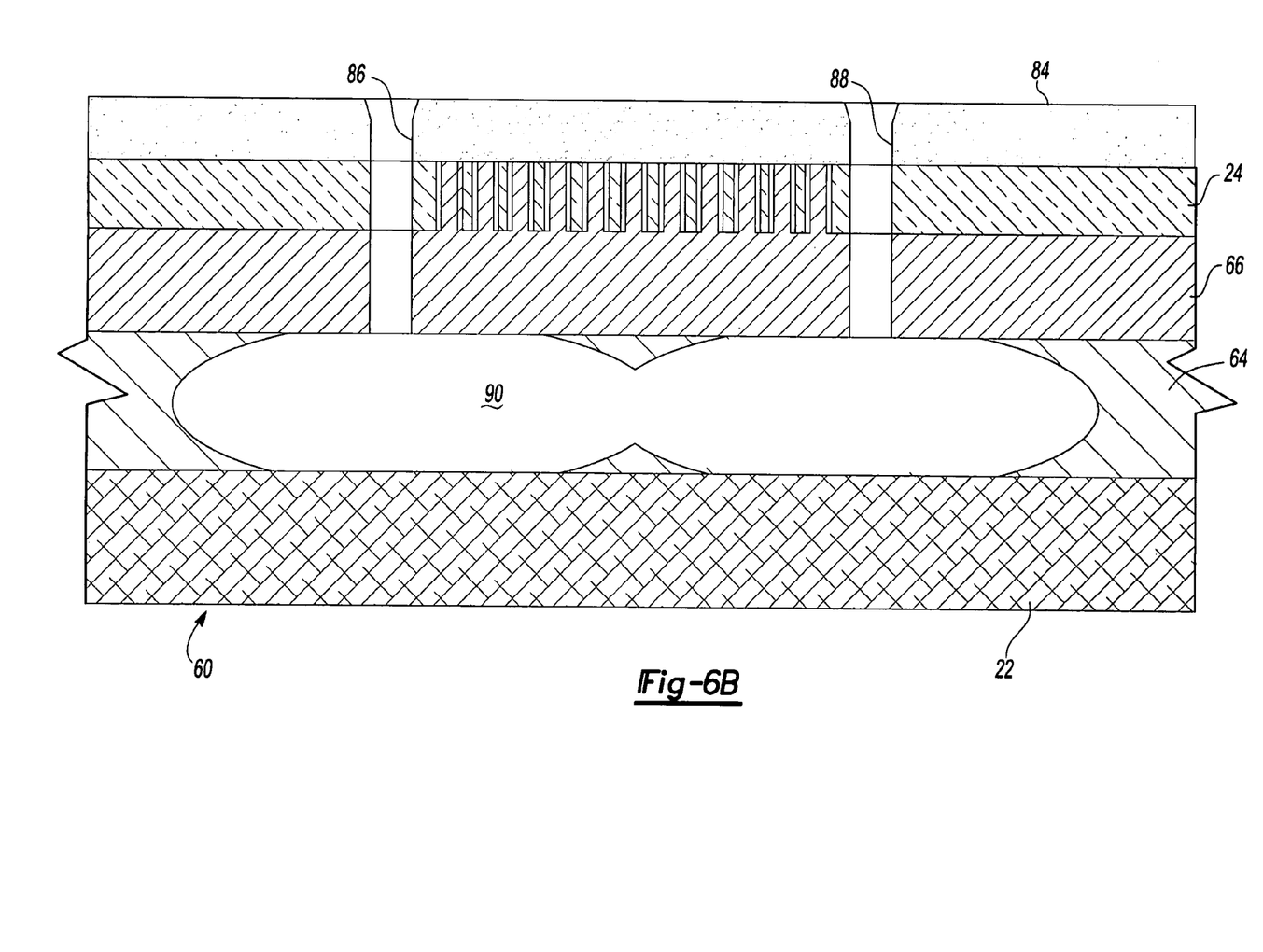
FIG. 6B is a sectional view taken along line 6B-6B in FIG. 6A.

With reference now to FIGS. 6A and 6B, using standard photoresist material 84 and standard photolithography procedures, a first elongated trench 86 is formed through the photoresist material 84 across the input end of the lattice structure 25. Similarly, a second elongated trench 88 is also formed across the lattice structure 25 adjacent the output end of the lattice structure 25.

A chosen acid as chemical etcher is then applied to the trenches 86 and 88 under the membrane layer 24 though the holes 26. The acid is selected so that both the substrate 22 and crystal membrane 24 are substantially impervious to the acid while the crystalline alloys used to form both the sacrificial layer 64 and bridge layer 66 are susceptible to the acid. For example, hydrofluoric acid is preferably used to perform the acid etch where the substrate 22 and membrane 24 comprise gallium arsenide while the sacrificial layer 64 and bridge layer 66 comprise aluminum alloys of gallium arsenide.

Since the sacrificial layer 64 has a higher aluminum content than the bridge layer 66, preferably at least 10% greater, the acid introduced into the trenches 86 and 88 effectively and rapidly removes the sacrificial layer 64 from the wafer 60 in the area directly aligned with and below the lattice structure 25. This, in turn, creates a void 90 in the wafer 60 beneath the bridge layer 66 and in alignment with the lattice structure 25. Conversely, the bridge layer 66 is less susceptible to the acid due to its lower aluminum content so that, as best shown in FIGS. 2 and 3, the bridge 32 remains substantially intact between the trenches 86. Following this acid etch, the photoresist material 84 is removed in the conventional fashion.

Figure 7:
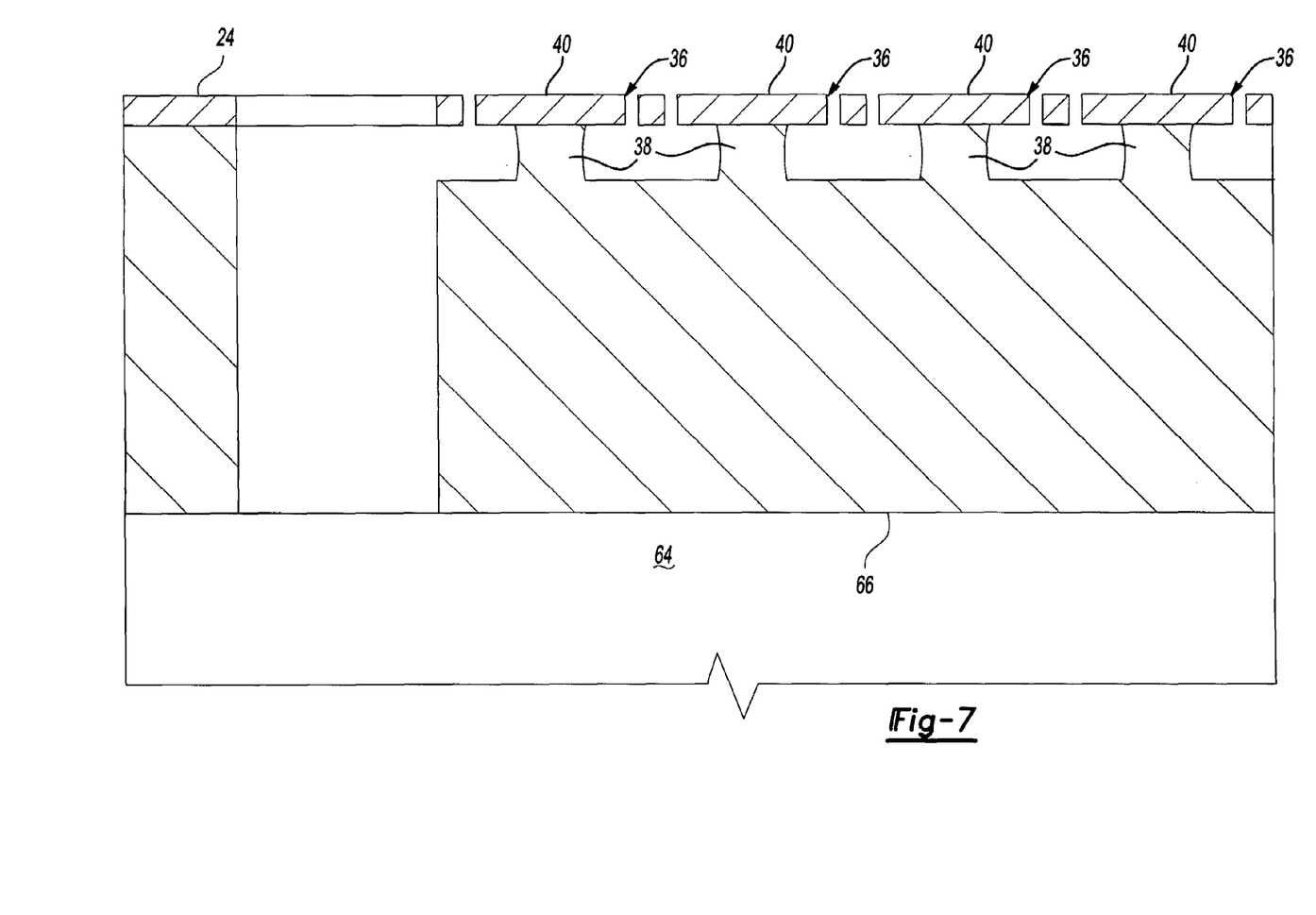
FIG. 7 is a sectional view similar to FIG. 6B but illustrating a further step in making the photonic band gap device of the present invention.

With reference to FIG. 7, a second and relatively shorter acid etch is then applied to the lattice structure 25. In doing so, the acid flows through the holes 26 in the lattice structure 25 and thus etches a portion of the bridge layer 66 beneath the membrane 24 and around the caps 40 of the posts 36. This acid etch, however, is carefully controlled so that the etch time and acid concentration is sufficient to separate the bridge layer 66 from the membrane 24, as shown in FIG. 4, while retaining the attachment of the posts 36 to the bridge layer 32. The lattice structure 25 is selected so that the holes 26 and posts 36 are much larger in diameter than the wall thickness of the lattice structure 25 between adjacent holes 26. Consequently, although some undercutting of the stems 38 of the posts 36 will occur during this acid etch, the post stems 38 remain substantially intact despite complete undercutting of the bridge layer 66 beneath the walls of the lattice structure 25.

Thereafter, electrical contacts are applied to the bridge layer 66 through a contact pad and substrate 22 in any conventional fashion.

From the foregoing, it can be seen that the present invention provides a reconfigurable photonic band gap device, and a method of making the same, which overcomes all of the disadvantages of the previously known devices. More specifically, by controlling the degree of insertion of the posts 36 into their corresponding lattice holes 26, the photonic device of the present invention can be configured to perform any of a number of different photonic functionalities.

Having described my invention, however, many modifications thereto will become apparent to those skilled in the art to which it pertains without deviation from the spirit of the invention as defined by the scope of the appended claims.

I claim:

1. A method for constructing a reconfigurable photonic band gap device comprising the steps of:
   forming a wafer having a crystal substrate, a sacrificial layer overlying said crystal substrate, a bridge layer overlying said sacrificial layer and a crystal membrane overlying said bridge layer,
   etching a photonic crystal lattice structure having at least one hole in said membrane,
   removing at least a portion of said sacrificial layer beneath said lattice,
   removing only a portion of said bridge layer sufficient to separate said bridge layer from said membrane while retaining at least one post attached to said bridge layer and aligned with one hole in said lattice structure.

2. The invention as defined in claim 1 and further comprising the step of attaching electrodes to said bridge layer and said substrate.

3. The invention as defined in claim 1 wherein said substrate, said sacrificial layer, said bridge layer and said membrane comprise compatible semiconductor crystal materials.

4. The invention as defined in claim 3 wherein said sacrificial layer and said bridge layer each comprise an alloy of said substrate.

5. The invention as defined in claim 1 wherein said etching step comprises electron beam lithography and reactive ion plasma etching.

6. The invention as defined in claim 1 wherein said at least one hole in said membrane comprises a plurality of holes in said membrane and wherein in said step of removing only a portion of said bridge layer sufficient to separate said bridge layer from said membrane while retaining at least one post attached to said bridge layer, said at least one post comprises a plurality of posts, each of said posts being in alignment with a corresponding hole in said lattice.

7. The invention as defined in claim 1 wherein each said removing step comprises the step of wet chemical etching.

* * * * *